US011933241B2

(12) United States Patent
Firsich et al.

(10) Patent No.: US 11,933,241 B2
(45) Date of Patent: Mar. 19, 2024

(54) PDI FUEL SYSTEM MONITOR

(71) Applicants: Nicholas Firsich, Clarkston, MI (US); Tyler S Blake, Farmington Hills, MI (US); Francesco Berti, Beverly Hills, MI (US); Alex Eskenazi-Gold, Ferndale, MI (US); Vadiraj P Kulkarni, Troy, MI (US)

(72) Inventors: Nicholas Firsich, Clarkston, MI (US); Tyler S Blake, Farmington Hills, MI (US); Francesco Berti, Beverly Hills, MI (US); Alex Eskenazi-Gold, Ferndale, MI (US); Vadiraj P Kulkarni, Troy, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 17/880,969

(22) Filed: Aug. 4, 2022

(65) Prior Publication Data

US 2024/0044300 A1 Feb. 8, 2024

(51) Int. Cl.
*F02D 41/22* (2006.01)
*F02D 41/30* (2006.01)
(Continued)

(52) U.S. Cl.
CPC ......... *F02D 41/22* (2013.01); *F02D 41/3094* (2013.01); *F02D 41/32* (2013.01);
(Continued)

(58) Field of Classification Search
CPC ................. F02D 41/22; F02D 41/3094; F02D 41/32–365; F02D 41/38; F02D 2041/224; F02D 2041/389
See application file for complete search history.

(56) References Cited

U.S. PATENT DOCUMENTS 8,342,158 B2 1/2013 Ulrey et al.
9,341,152 B2 5/2016 McAlister
(Continued)

FOREIGN PATENT DOCUMENTS

DE 102015214595 A1 2/2017
JP 2007032313 A * 2/2007 ......... F02D 41/1495
(Continued)

OTHER PUBLICATIONS

Inoue, JP 2008-014198, partial human translation. (Year: 2008).*
(Continued)

*Primary Examiner* — Hung Q Nguyen
*Assistant Examiner* — Mark L. Greene
(74) *Attorney, Agent, or Firm* — Jeremy J. Klobucar

(57) ABSTRACT

A fuel delivery system for a vehicle having an engine configured to selectively operate between a port fuel injection (PFI) mode, a gasoline direct injection (GDI) mode, and a port and direct fuel injection (PDI) mode. The fuel delivery system includes a PFI system including plurality of PFI injectors configured to supply fuel to the engine during the PFI mode, and a GDI system including a plurality of GDI injectors configured to supply fuel to the engine during the GDI mode. A fuel system monitor is configured to monitor the fuel delivery system when operating in the PFI mode, and attribute any fuel delivery system malfunctions occurring during the PFI mode to the PFI system alone, and monitor the fuel delivery system when operating in the GDI mode, and attribute any fuel delivery system malfunctions occurring during the GDI mode to the GDI system alone.

15 Claims, 2 Drawing Sheets

(51) Int. Cl.
*F02D 41/32* (2006.01)
*F02D 41/38* (2006.01)

(52) U.S. Cl.
CPC ........ *F02D 41/38* (2013.01); *F02D 2041/224* (2013.01); *F02D 2041/389* (2013.01)

(56) References Cited

U.S. PATENT DOCUMENTS

| | | | |
|---|---|---|---|
| 9,976,496 B2 | 5/2018 | Cohn et al. | |
| 10,288,005 B2 | 5/2019 | Cohn et al. | |
| 10,487,765 B2 * | 11/2019 | Maeda | F02D 41/047 |
| 10,760,520 B2 | 9/2020 | Surnilla et al. | |
| 2013/0174806 A1 | 7/2013 | Nagakura | |
| 2020/0003144 A1 | 1/2020 | Faied | |

FOREIGN PATENT DOCUMENTS

| | | | |
|---|---|---|---|
| JP | 2008014198 A * | 1/2008 | F02D 41/0007 |
| JP | 2010169038 A | 8/2010 | |
| JP | 2011026961 A | 2/2011 | |
| JP | 2013139181 A | 7/2013 | |

OTHER PUBLICATIONS

International Search Report and Written Opinion dated Oct. 24, 2023 for International Application No. PCT/US2023/071392, International Filing Date Aug. 1, 2023.

* cited by examiner

PDI FUEL SYSTEM MONITOR

FIELD

The present application relates generally to internal combustion engines and, more particularly, to a fuel system monitor for an engine having a port and direct fuel injection system.

BACKGROUND

Internal combustion engines have traditionally utilized port fuel injection (PFI) fuel delivery technology. PFI engines mix fuel and air in an intake port before the mixture is drawn into the engine cylinders for combustion. This mixing is performed to optimize the combustion and improve engine performance. More recently, gasoline direct injection (GDI) fuel delivery technology has been introduced to provide improved fuel economy. GDI engines draw air into the cylinder during the intake stroke, and fuel is injected directly into the cylinders during the intake or compression stroke to mix with the air. This type of mixing potentially provides improved fuel economy and engine performance under various load conditions. However, both PFI and GDI engines have their own unique advantages and disadvantages when compared to each other.

In an attempt to utilize the advantages of both systems, some engines include both port and direct fuel injection (PDI) fuel delivery systems. However, conventional monitoring systems are unable to pinpoint system specific malfunctions (i.e., whether the malfunction is in the PFI or GDI system) and can potentially false pass a failing system (e.g., the PFI system is malfunctioning but passes under a GDI operation). Thus, while such systems do work well for their intended purpose, it is desirable to provide continuous improvement in the relevant art.

SUMMARY

According to one example aspect of the invention, a fuel delivery system for a vehicle having an engine configured to selectively operate between a port fuel injection (PFI) mode, a gasoline direct injection (GDI) mode, and a port and direct fuel injection (PDI) mode, is provided. In one exemplary implementation, the fuel delivery system includes a PFI system including plurality of PFI injectors configured to supply fuel to the engine during the PFI mode, and a GDI system including a plurality of GDI injectors configured to supply fuel to the engine during the GDI mode. A fuel system monitor is configured to monitor the fuel delivery system when operating in the PFI mode, and attribute any fuel delivery system malfunctions occurring during the PFI mode to the PFI system alone, and monitor the fuel delivery system when operating in the GDI mode, and attribute any fuel delivery system malfunctions occurring during the GDI mode to the GDI system alone.

In addition to the foregoing, the described fuel delivery system may include one or more of the following features: wherein the fuel system monitor is further configured to monitor the fuel delivery system when operating in the PDI mode, and attribute any fuel delivery system malfunctions occurring during the PDI mode as a general fuel system fault; wherein the fuel delivery system includes a service procedure to determine if the general fuel system fault is being caused by the PFI system or the GDI system; wherein the service procedure includes providing a technician the ability to choose forcing the engine to operate in the PFI mode or the GDI mode.

In addition to the foregoing, the described fuel delivery system may include one or more of the following features: wherein the fuel system monitor includes a first monitor to only monitor the fuel delivery system in the PFI mode, a second monitor to only monitor the fuel delivery system in the GDI mode, and a third monitor to only monitor the fuel delivery system in the PDI mode; wherein the first monitor, the second monitor, and the third monitor are separate monitors; wherein the fuel system monitor is configured to set a PFI specific diagnostic trouble code (DTC) or a general DTC accompanied by a PFI specific service flag when the fuel delivery system malfunction occurs while operating in the PFI mode; and wherein the fuel system monitor is configured to set a GDI specific diagnostic trouble code (DTC) or a general DTC accompanied by a GDI specific service flag when the fuel delivery system malfunction occurs while operating the in the GDI mode.

In addition to the foregoing, the described fuel delivery system may include one or more of the following features: wherein the fuel system monitor is configured to set a general fault when the fuel delivery system malfunction occurs while operating in the PDI mode; wherein the fuel delivery system malfunctions are air-fuel ratio errors; wherein the fuel delivery system malfunctions indicate the fuel delivery system is operating too lean or too rich; and wherein the fuel system monitor is configured to monitor a short term fuel trim (STFT) and a long term fuel trim (LTFT) to determine if the fuel delivery system malfunctions occur during the PFI mode, the GDI mode, or the PDI mode.

According to another example aspect of the invention, a method of monitoring a fuel delivery system of a vehicle having an engine with a fuel system monitor, a port fuel injection (PFI) system, and a gasoline direct injection (GDI) system, the engine configured to selectively operate between a PFI mode, a GDI mode, and a port and direct fuel injection (PDI) mode, is provided. The method includes, in one exemplary implementation, monitoring, via the fuel system monitor, the fuel delivery system when operating in the PFI mode, and attributing any fuel delivery system malfunctions occurring during the PFI mode to the PFI system alone, and monitoring, via the fuel system monitor, the fuel delivery system when operating in the GDI mode, and attributing any fuel delivery system malfunctions occurring during the GDI mode to the GDI system alone.

In addition to the foregoing, the described method may include one or more of the following features: monitoring, via the fuel system monitor, the fuel delivery system when operating in the PDI mode, and attributing any fuel delivery system malfunctions occurring during the PDI mode as a general fuel system fault; wherein the fuel system monitor includes a first monitor to only monitor the fuel delivery system in the PFI mode, a second monitor to only monitor the fuel delivery system in the GDI mode, and a third monitor to only monitor the fuel delivery system in the PDI mode; and setting a PFI specific diagnostic trouble code (DTC) or a general DTC accompanied by a PFI specific service flag when the fuel delivery system malfunction occurs while operating in the PFI mode, setting a GDI specific DTC or a general DTC accompanied by a GDI specific service flag when the fuel delivery system malfunction occurs while operating in the GDI mode, and setting a general fault when the fuel delivery system malfunction occurs while operating in the PDI mode.

In addition to the foregoing, the described method may include one or more of the following features: wherein the fuel delivery system malfunctions are air-fuel ratio errors indicating the fuel delivery system is operating too lean or too rich; and monitoring, with the fuel system monitor, a short term fuel trim (STFT) and a long term fuel trim (LTFT) to determine if the fuel delivery system malfunction occurs during the PFI mode, the GDI mode, or the PDI mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
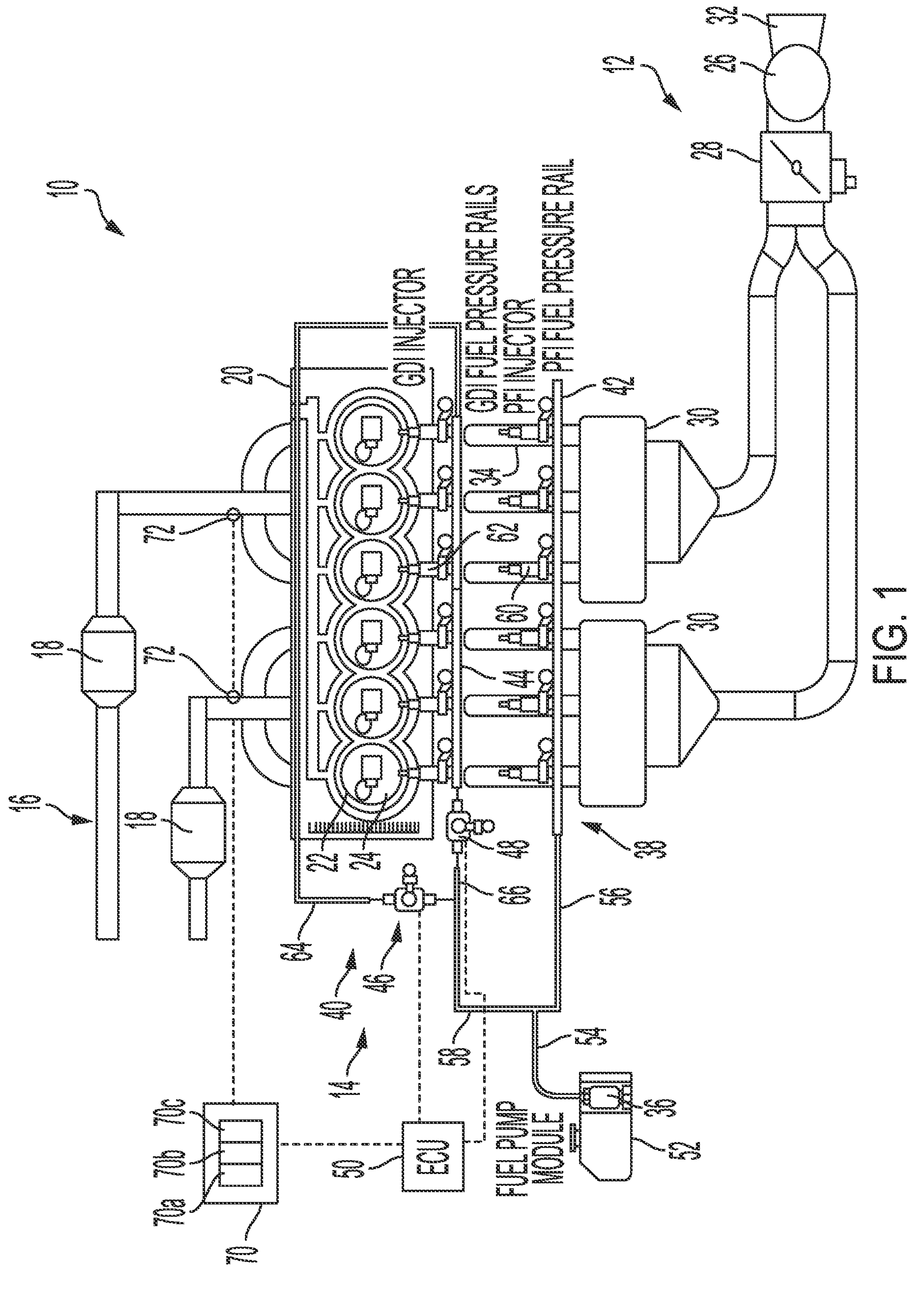
FIG. 1 is a schematic illustration of an engine and fuel delivery system in accordance with the principles of the present disclosure.

The present application is generally directed to a monitoring system and method for a fuel delivery system for an engine equipped with a port and direct fuel injection (PDI) system, which is configured to selectively operate between a port fuel injection (PFI) mode, a gasoline direct injection (GDI) mode, or a combination of both (PDI mode). The fuel delivery system changes operational modes to utilize the benefits of both PFI and GDI systems, for example, to reduce emissions and/or improve fuel economy. GDI system benefits include charge cooling/knock mitigation, combustion stability (EGR), light-off/spark retard authority, burn duration reduction, and multiple injection events. PFI system benefits include fuel/air vaporization time (cold), reduced intake/valve deposits, particulate reduction, reduced risk of oil dilution, and quieter operation.

In the example embodiment, the PDI fuel system monitor is a diagnostic strategy with the engine control unit (ECU) that allows the fuel system monitor to pinpoint if an air-fuel ratio error is coming from the PFI injection system or the GDI injection system. The PDI fuel system monitor utilizes short term and long term fuel trims to determine if a lean or rich malfunction exists. In one example, the short term fuel trim (STFT) is an instantaneous correction to the amount of fuel being delivered to the engine based on an error as indicated by one or more O2 sensors. The long term fuel trim (LTFT) is an accumulated correction of the amount of fuel being delivered to the engine. The LTFT may also be referred to as a volumetric efficiency correction that describes a correction to the airflow estimation model. The LTFT and the STFT work together to ensure the error in the amount of fuel delivered to the engine is at a minimum. The sum of the LTFT and STFT indicates a total fuel trim, or total system richness or leanness.

During operation, there are engine speeds/loads where the engine will operate with only the PFI system, only the GDI system, or a combination of both PFI and GDI systems. In this way, the PDI fuel system monitor includes three different monitoring modes that are selectively utilized based on the fueling mode of the PDI equipped engine.

If the engine is operating in PFI only mode, the fuel system monitor will attribute any fuel system malfunctions to the PFI system alone by either setting a DTC specific to the PFI system or by setting a general DTC accompanied by a service flag specific to the PFI system. Similarly, if the engine is operating in GDI only mode, the fuel system monitor will attribute any fuel system malfunction to the GDI system alone by either setting a DTC specific to the GDI system or by setting a general DTC accompanied by a service flag specific to the GDI system. When running in the PDI mode where both the PFI and GDI systems are utilized, the fuel system monitor will set any fuel system malfunction as a general fuel system DTC regardless of configuration.

In one aspect, if a general fault is set without being accompanied by a PFI or GDI specific DTC or service flag, the system is configured for a service procedure to pinpoint if the general fault is being caused by one specific system. This service procedure will allow a technician the ability to choose which fueling mode the vehicle runs in (PFI or GDI). Once the vehicle is running in full DI or PFI mode, the technician is able to use the resulting fuel trims to pinpoint which system is causing the issue. In one example, the problematic system is identified as showing much larger fuel trims than the other system (s).

In one example embodiment, the PDI fuel system monitor can be configured in one of two ways. The first configuration sets separate, specific diagnostic trouble codes (DTCs) for PFI, GDI, and general malfunctions. The second configuration sets one generic DTC configured to be accompanied by service flags specific to the PFI or GDI system.

For the first configuration, the fuel system monitor can only clear a PFI specific, DI specific, or general fuel system DTC if the fuel system monitor has passed while running in the same fueling mode in which the specific DTC was set (i.e., the system must pass in PFI mode to clear a PFI specific DTC). For the second configuration, the fuel system monitor can only clear a fuel system monitor fault if the accompanied service flag(s) have also been cleared. The PFI and GDI service flags can only clear when running in their respective modes.

With initial reference to FIG. 1, an example internal combustion engine for a vehicle is illustrated and generally identified at reference numeral 10. The internal combustion engine 10 generally includes an air induction system 12, a fuel delivery system 14, and an exhaust system 16.

The engine 10 further includes a cylinder head and block 20 defining one or more cylinders 22 each receiving a reciprocating piston (not shown) therein. Air and fuel are respectively supplied to combustion chambers 24 of the cylinders 22 via the air induction system 12 and the fuel delivery system 14. The air/fuel mixture is ignited in the combustion chamber 24 and the resulting combustion gas is directed from the chamber 24 to the exhaust system 16.

The air induction system 12 generally includes an air filter 26, a throttle control valve 28, and an intake manifold 30. Air enters the vehicle through an air intake 32 and is filtered in the air filter 26 before being delivered to intake ports 34 of the cylinders 22 for combustion therein.

In the example embodiment, the fuel delivery system 14 generally includes a low pressure fuel pump 36, a port fuel injection (PFI) fuel system 38, and a gasoline direct injection (GDI) fuel system 40. The PFI fuel system 38 includes a PFI fuel pressure rail 42 and a plurality of PFI injectors 60, and the GDI fuel system 40 includes a GDI fuel pressure rail 44, a plurality of GDI injectors 62, a first deactivating GDI fuel pump assembly 46, and a second deactivating GDI fuel pump assembly 48. In the example embodiment, the engine 10 includes a tri-function fuel delivery system 14 that is configured to be controlled by an engine control unit (ECU) 50 to selectively operate between a PFI mode, a GDI mode, or a combination of both (PDI mode), as described herein in more detail. In general, the engine is operated in the PFI mode during low engine load conditions or when charge motion is low, operated in the GDI mode when during high engine load conditions or where charge motion is high, and operated in PDI mode for other speed/load conditions.

The low pressure fuel pump 36 is disposed within a fuel tank 52 and is configured to supply fuel from the fuel tank 52 to a main fuel delivery line 54. As illustrated, the main fuel delivery line 54 supplies fuel to a PFI fuel delivery line 56 and a GDI fuel delivery line 58. The PFI fuel delivery line 56 is fluidly coupled to the PFI fuel pressure rail 42 to supply the fuel to the PFI injectors 60. In the example embodiment, PFI injectors 60 are configured to supply fuel to the intake ports 34 where the fuel is mixed with air from the air induction system 12 before being supplied to the combustion chambers 24.

The GDI fuel delivery line 58 is fluidly coupled to the GDI fuel pressure rail 44 to supply the fuel to the GDI injectors 62. In the example embodiment, GDI injectors 62 are configured to supply fuel directly to the cylinders 22 where the fuel is mixed with air from the air induction system 12 and combusted. Additionally, as shown in FIG. 1, GDI fuel delivery line 58 is split into a first GDI fuel supply line 64 and a second GDI fuel supply line 66 to supply. Each of the first and second fuel supply lines 64, 66 is fluidly coupled to the GDI fuel pressure rail 44 such that an increased supply of fuel can be provided to the GDI injectors 62 when high output is required to meet peak engine power or torque requirements. In one example, first GDI fuel supply line 64 supplies one portion of the GDI injectors 62 (e.g., three), and the second GDI fuel supply line 66 supplies another portion of the GDI injectors 62 (e.g., the remaining three). However, in embodiments with only a single deactivating GDI pump assembly 46, 48, all GDI injectors 62 are supplied by that assembly 46 or 48.

The GDI fuel pump assemblies 46, 48 are disposed on the GDI fuel supply lines 64, 66 and are configured to be controlled by ECU 50 (or other controller) to selectively operate between an activated mode and a deactivated mode. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

With continued reference to FIG. 1, the engine 10, equipped with PFI, GDI, and PDI operational capabilities, is configured to operate in various modes to selectively improve vehicle emissions, fuel economy, and/or engine power output. In order to pinpoint any malfunctions in the fuel delivery system 14, the engine 10 includes a PDI fuel system monitor 70, which may include one or more controllers or modules. The PDI fuel system monitor 70 is in signal communication with ECU 50, which is also in signal communication with one or more O2 sensors 72 located in the exhaust system 16.

In the example embodiment, the PDI fuel system monitor 70 is configured for PFI and GDI specific malfunction pinpointing. In particular, the PDI fuel system monitor 70 is split into three discrete or separate monitors (70*a*, 70*b*, 70*c*), which may be three separate controllers/modules or part of a single controller/module. The first monitor 70*a* is exclusively for PFI mode operation, the second monitor 70*b* is exclusively for GDI mode operation, and the third monitor 70*c* is exclusively for PDI mode operation. Each monitor 70 is enabled when its respective fuel mode is commanded, and each monitor has its own pass/fail timers or counter (e.g., to facilitate preventing a pass timer/counter for GDI fault from incrementing when in PFI mode). The separate monitors have similar condition windows and can set PFI/GDI/General faults at the same time. PFI and GDI mode faults each include system specific P-codes indicating whether the fuel delivery system 14 is too lean or too rich in that mode.

In the example embodiment, the first monitor 70*a* is configured to set PFI specific DTCs or flags when operating in PFI only mode, and the second monitor 70*b* is configured to set GDI specific DTCs or flags when operating in GDI only mode. The third monitor 70*c* is configured to set general malfunction DTCs when in PDI mode. If a general malfunction DTC is set without being accompanied by a system specific DTC or flag, a subsequent service procedure can be performed to allow a technician to pinpoint which system (PFI or GDI) is causing the issue. In one example, the technician is able to set the fuel mode to full PFI or full DI in order to look at the resulting fuel trims and identify which system is malfunctioning.

Figure 2:
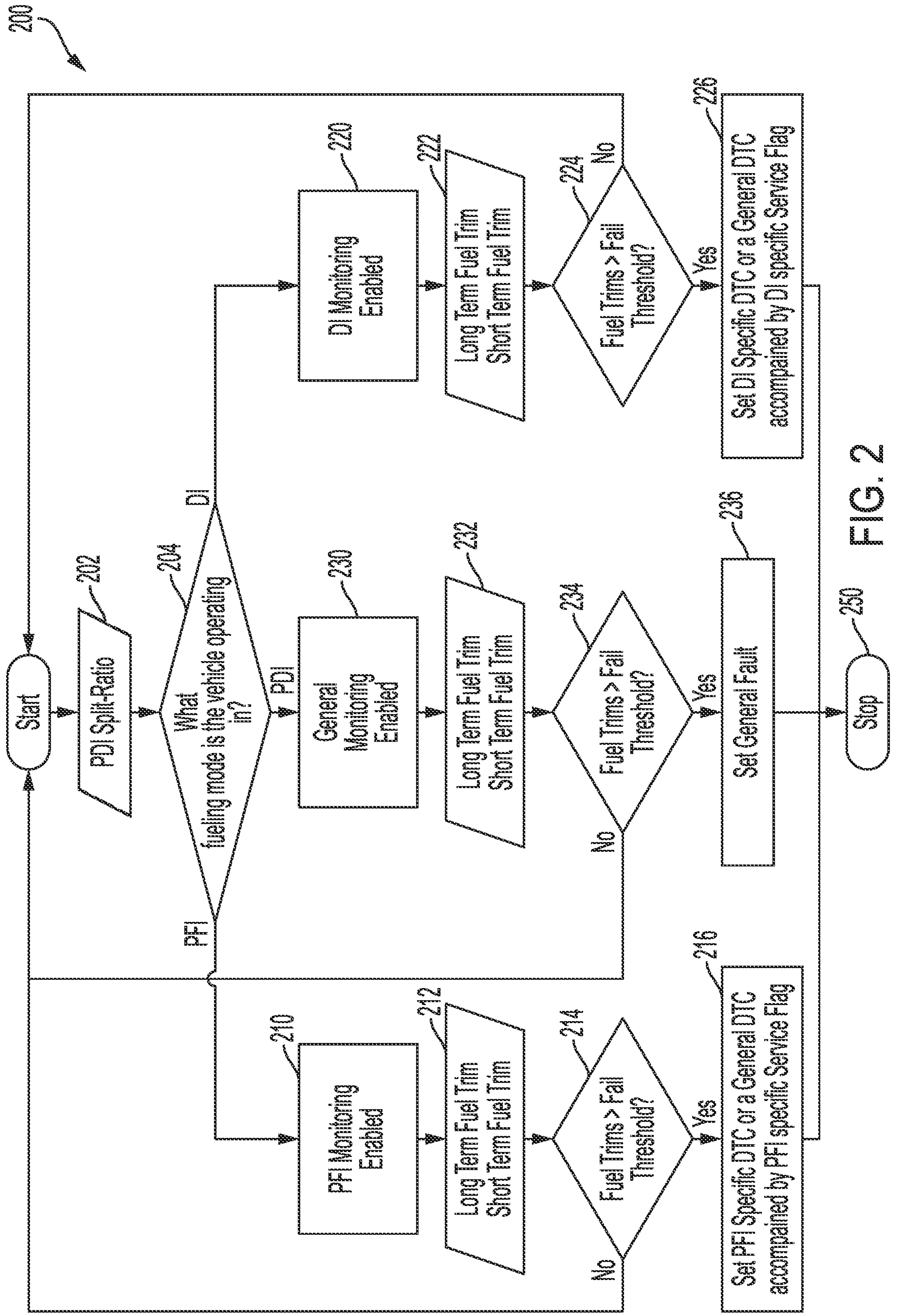
FIG. 2 illustrates example method of monitoring and controlling the fuel delivery system shown in FIG. 1, in accordance with the principles of the present disclosure.

Referring now to FIG. 2, a flow diagram of an example PDI fuel system monitor control method 200 according to the principles of the present disclosure is illustrated. At 202, PDI fuel system monitor 70 determines a PDI split-ratio for the fuel delivery system 14. In one example, the split-ratio is the ratio of fuel mass injection by the GDI injectors versus the PFI injectors. For example, a split-ratio of 0.5 means that the GDI injectors are delivering 50% of the fuel and the other 50% of fuel is being delivered by the PFI injectors. At step 204, based on the determined PDI split-ratio, the PDI fuel system monitor 70 determines if the fuel delivery system 14 is operating in the PFI mode, the GDI mode, or the PDI mode.

If the fuel delivery system 14 is operating in the PFI mode, at step 210, the PDI fuel system monitor 70 enables the first monitor 70*a* (PFI mode monitor). At step 212, first monitor 70*a* monitors the LTFT and STFT (e.g., overall fuel trim) of the fuel delivery system 14 to determine if a lean or rich malfunction exists. At step 214, first monitor 70*a* determines if the determined fuel trims (e.g., overall fuel trims) are greater than a calibratable predetermined fail threshold. If no, control returns to step 202. If yes, at step 216, first monitor sets a PFI specific DTC or a general DTC accompanied by a PFI specific service flag (e.g., indicating a rich condition or a lean condition). Control then ends at step 250 and may return to step 204 for another cycle.

If the fuel delivery system 14 is operating in the GDI mode, at step 220, the PDI fuel system monitor 70 enables the second monitor 70*b* (GDI mode monitor). At step 222, second monitor 70*b* monitors the LTFT and STFT (e.g., overall fuel trim) of the fuel delivery system 14 to determine if a lean or rich malfunction exists. At step 224, second monitor 70*b* determines if the determined fuel trims (e.g., overall fuel trims) are greater than a calibratable predetermined fail threshold. If no, control returns to step 202. If yes, at step 226, second monitor 70*b* sets a GDI specific DTC or a general DTC accompanied by a GDI specific service flag (e.g., indicating a rich condition or a lean condition). Control then ends at step 250 and may return to step 204 for another cycle.

If fuel delivery system 14 is operating in the PDI mode, at step 230, the PDI fuel system monitor enables the third monitor 70*c* (PDI mode monitor). At step 232, third monitor 70*c* monitors the LTFT and STFT (e.g., overall fuel trim) of the fuel delivery system 14 to determine if a lean or rich malfunction exists. At step 234, the third monitor 70*c* determines if the determined fuel trims (e.g., overall fuel trims) are greater than a calibratable predetermined fail threshold. If no, control returns to step 202. If yes, at step 236, third monitor 70*c* sets a general fault without being accompanied by a PFI or GDI specific DTC or service flag. Control then ends at step 250 and may return to step 204 for another cycle.

Described herein are systems and methods for a fuel delivery system for an internal combustion engine. The engine and fuel delivery system are configured to selectively operate between a PFI mode, a GDI mode, and PDI mode. A PDI fuel system monitoring strategy is configured to identify if a malfunction is coming from the GDI or PFI system based on the fueling mode. There will be either PFI or GDI specific DTCs or flags to indicate which system is causing the issue, which can only be cleared when operating in those specific fueling modes. If a fuel system malfunction is detected while operating in PDI mode, a general fault is set, and a service procedure can be performed for pinpointing the malfunctioning system if a conclusion cannot be made from the existing DTCs or flags.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A fuel delivery system for a vehicle having an engine configured to selectively operate between a port fuel injection (PFI) mode, a gasoline direct injection (GDI) mode, and a port and direct fuel injection (PDI) mode, the fuel delivery system comprising:
- a PFI system including a plurality of PFI injectors configured to supply fuel to the engine during the PFI mode;
- a GDI system including a plurality of GDI injectors configured to supply fuel to the engine during the GDI mode; and
- a fuel system monitor configured to:
  - monitor the fuel delivery system when operating in the PFI mode, and attribute any fuel delivery system malfunctions occurring during the PFI mode to the PFI system alone;
  - monitor the fuel delivery system when operating in the GDI mode, and attribute any fuel delivery system malfunctions occurring during the GDI mode to the GDI system alone; and
  - monitor the fuel delivery system when operating in the PDI mode, and attribute any fuel delivery system malfunctions occurring during the PDI mode as a general fuel system fault,
- wherein the fuel system monitor is configured to monitor a short term fuel trim (STFT) and a long term fuel trim (LTFT) to determine if the fuel delivery system malfunctions occur during the PFI mode, the GDI mode, or the PDI mode.

2. The fuel delivery system of claim 1, wherein the fuel delivery system includes a service procedure to determine if the general fuel system fault is being caused by the PFI system or the GDI system.

3. The fuel delivery system of claim 1, wherein the fuel system monitor includes a first monitor to only monitor the fuel delivery system in the PFI mode, a second monitor to only monitor the fuel delivery system in the GDI mode, and a third monitor to only monitor the fuel delivery system in the PDI mode.

4. The fuel delivery system of claim 3, wherein the first monitor, the second monitor, and the third monitor are separate monitors.

5. The fuel delivery system of claim 1, wherein the fuel system monitor is configured to set a PFI specific diagnostic trouble code (DTC) or a general DTC accompanied by a PFI specific service flag when the fuel delivery system malfunction occurs while operating in the PFI mode.

6. The fuel delivery system of claim 1, wherein the fuel system monitor is configured to set a GDI specific diagnostic trouble code (DTC) or a general DTC accompanied by a GDI specific service flag when the fuel delivery system malfunction occurs while operating in the GDI mode.

7. The fuel delivery system of claim 1, wherein the fuel system monitor is configured to set a general fault when the fuel delivery system malfunction occurs while operating in the PDI mode.

8. The fuel delivery system of claim 1, wherein the fuel delivery system malfunctions are air-fuel ratio errors.

9. The fuel delivery system of claim 1, wherein the fuel delivery system malfunctions indicate the fuel delivery system is operating too lean or too rich.

10. A fuel delivery system for a vehicle having an engine configured to selectively operate between a port fuel injection (PFI) mode, a gasoline direct injection (GDI) mode, and a port and direct fuel injection (PDI) mode, the fuel delivery system comprising:
- a PFI system including a plurality of PFI injectors configured to supply fuel to the engine during the PFI mode;
- a GDI system including a plurality of GDI injectors configured to supply fuel to the engine during the GDI mode; and
- a fuel system monitor configured to:
  - monitor the fuel delivery system when operating in the PFI mode, and attribute any fuel delivery system malfunctions occurring during the PFI mode to the PFI system alone;
  - monitor the fuel delivery system when operating in the GDI mode, and attribute any fuel delivery system malfunctions occurring during the GDI mode to the GDI system alone; and monitor the fuel delivery system when operating in the PDI mode, and attribute any fuel delivery system malfunctions occurring during the PDI mode as a general fuel system fault, wherein the fuel delivery system includes a service procedure to determine if the general fuel system fault is being caused by the PFI system or the GDI system, and wherein the service procedure includes providing a technician the ability to choose forcing the engine to operate in the PFI mode or the GDI mode.

11. A method of monitoring a fuel delivery system of a vehicle having an engine with a fuel system monitor, a port fuel injection (PFI) system, and a gasoline direct injection (GDI) system, the engine configured to selectively operate between a PFI mode, a GDI mode, and a port and direct fuel injection (PDI) mode, the method comprising:

monitoring, via the fuel system monitor, the fuel delivery system when operating in the PFI mode, and attributing any fuel delivery system malfunctions occurring during the PFI mode to the PFI system alone;

monitoring, via the fuel system monitor, the fuel delivery system when operating in the GDI mode, and attributing any fuel delivery system malfunctions occurring during the GDI mode to the GDI system alone; and monitoring, with the fuel system monitor, a short term fuel trim (STFT) and a long term fuel trim (LTFT) to determine if the fuel delivery system malfunction occurs during the PFI mode, the GDI mode, or the PDI mode.

12. The method of claim 11, further comprising:

monitoring, via the fuel system monitor, the fuel delivery system when operating in the PDI mode, and attributing any fuel delivery system malfunctions occurring during the PDI mode as a general fuel system fault.

13. The method of claim 11, wherein the fuel system monitor includes a first monitor to only monitor the fuel delivery system in the PFI mode, a second monitor to only monitor the fuel delivery system in the GDI mode, and a third monitor to only monitor the fuel delivery system in the PDI mode.

14. The method of claim 11, further comprising:

setting a PFI specific diagnostic trouble code (DTC) or a general DTC accompanied by a PFI specific service flag when the fuel delivery system malfunction occurs while operating in the PFI mode;

setting a GDI specific DTC or a general DTC accompanied by a GDI specific service flag when the fuel delivery system malfunction occurs while operating in the GDI mode; and setting a general fault when the fuel delivery system malfunction occurs while operating in the PDI mode.

15. The method of claim 11, wherein the fuel delivery system malfunctions are air-fuel ratio errors indicating the fuel delivery system is operating too lean or too rich.

* * * * *